United States Patent
Bouillon et al.

(10) Patent No.: US 8,840,686 B2
(45) Date of Patent: Sep. 23, 2014

(54) METHOD OF DIRECT ENCAPSULATION OF A THIN-FILM LITHIUM-ION TYPE BATTERY ON THE SUBSTRATE

(75) Inventors: Pierre Bouillon, Luynes (FR); Patrick Hauttecoeur, Cerelles (FR); Benoit Riou, Tours (FR); Laurent Barreau, Cinq Mars la Pile (FR)

(73) Assignee: STMicroelectronics (Tours) SAS, Tours (FR)

( * ) Notice: Subject to any disclaimer, the term of this patent is extended or adjusted under 35 U.S.C. 154(b) by 653 days.

(21) Appl. No.: 12/859,941

(22) Filed: Aug. 20, 2010

(65) Prior Publication Data

US 2011/0052979 A1    Mar. 3, 2011

(30) Foreign Application Priority Data

Aug. 28, 2009    (FR) .................................... 09 55868

(51) Int. Cl.
  *H01M 10/0585*    (2010.01)
  *H01M 10/02*    (2006.01)
  *H01M 2/00*    (2006.01)
  *H01M 10/0525*    (2010.01)
  *H01M 6/40*    (2006.01)
  *H01M 10/04*    (2006.01)
  *H01M 2/10*    (2006.01)

(52) U.S. Cl.
  CPC .......... *H01M 10/0525* (2013.01); *Y02E 60/122* (2013.01); *H01M 6/40* (2013.01); *H01M 10/0585* (2013.01); *H01M 10/0436* (2013.01); *H01M 2/1061* (2013.01)

USPC ......... 29/623.2; 29/623.5; 429/162; 429/163; 429/171

(58) Field of Classification Search
  None
  See application file for complete search history.

(56) References Cited

U.S. PATENT DOCUMENTS

| | | |
|---|---|---|
| 2007/0067984 A1 | 3/2007 | Gaillard et al. |
| 2007/0238019 A1 | 10/2007 | Laurent et al. |
| 2008/0032236 A1* | 2/2008 | Wallace et al. ............... 430/319 |
| 2009/0032964 A1* | 2/2009 | Farnworth et al. ............ 257/774 |
| 2009/0214899 A1* | 8/2009 | Shakespeare et al. ............ 429/7 |

OTHER PUBLICATIONS

French Search Report dated Apr. 1, 2010 from corresponding French Application No. 09/55868.

* cited by examiner

*Primary Examiner* — Kwang Han
(74) *Attorney, Agent, or Firm* — Allen, Dyer, Doppelt, Milbrath & Gilchrist, P.A.

(57) ABSTRACT

A method for encapsulating a thin-film lithium-ion type battery, including the steps of: forming, on a substrate, an active stack having as a lower layer a cathode collector layer extending over a surface area larger than the surface area of the other layers; forming, over the structure, a passivation layer including through openings at locations intended to receive anode collector and cathode collector contacts; forming first and second separate portions of an under-bump metallization, the first portions being located on the walls and the bottom of the openings, the second portions covering the passivation layer; and forming an encapsulation layer over the entire structure.

12 Claims, 3 Drawing Sheets

METHOD OF DIRECT ENCAPSULATION OF A THIN-FILM LITHIUM-ION TYPE BATTERY ON THE SUBSTRATE

CROSS REFERENCE TO RELATED APPLICATIONS

This application claims the priority benefit of French patent application number 09/55868, filed on Aug. 28, 2009, entitled "METHOD OF DIRECT ENCAPSULATION OF A THIN-FILM LITHIUM-ION TYPE BATTERY ON THE SUBSTRATE," which is hereby incorporated by reference to the maximum extent allowable by law.

BACKGROUND OF THE INVENTION

1. Field of the Invention

The present invention relates to a method of encapsulation of a thin-film lithium-ion type battery and, more specifically, to a method of encapsulation of such a battery directly on the substrate supporting it.

2. Discussion of the Related Art

Lithium-ion batteries have the advantage of comprising a solid non-flammable electrolyte, which further has a good ion conductivity over a wide range of temperatures. Such batteries could advantageously be used in mobile electronic devices such as cell phones or laptop computers.

To form thin-film lithium-ion batteries, typically batteries having dimensions smaller than $2.5 \times 2.5$ cm$^2$, the use of techniques of sputtering through a shadow mask is known. Such techniques comprise placing a shadow mask above a support or substrate and sputtering, through this mask, the different layers forming the battery (active layers).

Generally, many thin-film batteries are formed simultaneously on a same substrate. Then, the substrate is diced to provide individual or elementary batteries which are placed in packages or encapsulated. Such packages connect the various active layers of the elementary batteries to the connection pads formed at the periphery of these packages.

FIG. 1 very schematically illustrates a packaged or encapsulated elementary lithium-ion battery. A stack 12 of the different active and contact layers of a lithium-ion type battery is formed on a portion of a substrate 10. Stack 12 may be formed, for example, by a succession of physical vapor depositions (PVD).

Stack 12 comprises a first cathode collector layer 14, a second cathode layer 16, a third layer 18 forming the battery electrolyte, a fourth layer 20 forming the anode of the battery, and a fifth layer 22 forming an anode collector. In the shown example, cathode collector layer 14 extends over the entire surface of substrate 10 while the other layers of stack 12 extend over a smaller surface area. This enables taking a contact on cathode collector layer 14.

The assembly of substrate 10 and of stack 12 is attached to the surface of a plate 24 forming the lower portion of the package. In the shown example, bonding wires 26 and 28 are attached at one of their ends, respectively, to cathode collector layer 14 and to anode collector layer 22 and, at their other end, to plate 24. Metal connections (not shown) are conventionally provided on and/or through plate 24 to transfer contacts 26 and 28 to the outside of the package. An insulating passivation and encapsulation material 30 is formed at the surface and on the sides of the assembly of substrate 10 and of stack 12 to complete the structure.

It should be noted that the package disclosed in relation with FIG. 1 is an example only of the many packages available to encapsulate lithium-ion type batteries. Especially, the connection by wires 26/28 between the active battery layers and support 24 may be performed by solder bumps. Further, insulating material 30 may be formed of a stack of several insulating passivation layers (for example, resins) and encapsulation layers (for example, ceramics).

In conventional battery packages such as that of FIG. 1, the surface area taken up by substrate 10 amounts to between half and three quarters of the total surface area of the encapsulated battery. For example, in a $3 \times 3$ mm$^2$ package formed in LGA (Land Grid Array) technology, a substrate supporting a battery takes up approximately 66% of the package surface area and, in a $5 \times 5$ mm$^2$ package forming in QFN (Quad Flat No leads) technology, the substrate takes up approximately 46% of the package surface area.

Further, the active portion of a lithium-ion type battery generally takes up three quarters of the surface area of the substrate on which it is formed. Thus, the active portion of an elementary battery takes up a surface area smaller than one quarter of the surface area of the final package. If the size of the elementary battery is decreased, the ratio between the active surface area of the battery and the package surface area further decreases, which makes it less useful to decrease the size of elementary batteries since the size of the encapsulated batteries decreases little. Thus, currently, a battery of lithium-ion type formed in a $3 \times 3$ mm$^2$ package cannot store a capacity greater than one microampere-hour.

Before the packaging, problems appear as the substrate is being diced to form individual batteries. Indeed, the substrate dicing is generally followed by one or several steps of cleaning with aqueous compounds. During the cleaning operation(s), the insulating passivation and/or encapsulation material deposited on the active battery layers tends to dislocate or to separate from these active layers, which then find themselves in contact with the cleaning agents. Part of the active layers of a lithium-ion type battery being formed of highly-reactive lithium derivatives, it is as much as possible avoided to put these layers in contact with aqueous compounds.

There thus is a need for a method of encapsulation of a lithium-ion type battery which increases the ratio between the active surface area of the elementary batteries and the total surface area of the packaged battery and avoids the above-mentioned problems of separation.

SUMMARY OF THE INVENTION

An object of an embodiment of the present invention is to provide a method of encapsulation of a lithium-ion type battery directly at the substrate level.

Another object of an embodiment of the present invention is to provide a method for forming a thin-film lithium-ion type battery on a substrate which can be diced without altering the active battery layers.

Thus, an embodiment of the present invention provides a method for encapsulating a thin-film lithium-ion type battery, comprising the steps of: (a) forming, on a substrate, an active stack having as a lower layer a cathode collector layer extending over a surface area larger than the surface area of the other layers; (b) forming, over the structure, a passivation layer comprising through openings at locations intended to receive anode collector and cathode collector contacts; (c) forming first and second separate portions of an under-bump metallization, the first portions being located on the walls and the bottom of the openings, the second portions covering the passivation layer; and (d) forming an encapsulation layer over the entire structure.

According to an embodiment of the present invention, step (b) is preceded by the steps of: forming a conformal insulating layer on the structure; defining through openings in the insulating layer to expose at least a portion of the cathode collector layer and at least a portion of an anode collector layer; forming conductive portions in said openings, at least some portions extending over the insulating layer to form offset contacts.

According to an embodiment of the present invention, step (d) is preceded by a step of forming of solder bumps on the first portions of the under-bump metallization, the encapsulation layer leaving the surface of said solder bumps apparent.

According to an embodiment of the present invention, step (d) further comprises the forming of a rear encapsulation layer on the substrate surface opposite to the surface supporting the active stack.

According to an embodiment of the present invention, the method further comprises an initial step of forming of an insulating layer at the surface of the substrate.

According to an embodiment of the present invention, the passivation and encapsulation layers are made of an epoxy resin.

According to an embodiment of the present invention, the first and second portions of the under-bump metallization are formed of a stack of a first layer enabling to ensure the adhesion to the lower layer, of a second layer forming a barrier against the diffusion between the lower layer and a third layer, the third layer ensuring the adhesion of the soldering.

According to an embodiment of the present invention, the active stack further comprises, on the cathode collector layer, a cathode layer, an electrolyte layer, an anode layer, and an anode collector layer, the anode and anode contact layers extending over a surface area smaller than the surface area of the cathode and electrolyte layers.

An embodiment of the present invention further provides an encapsulated lithium-ion type battery, comprising: on a substrate, an active stack having as a lower layer a cathode collector layer extending over a surface area greater than the surface area of the other layers; a passivation layer extending over the active stack and comprising through contact openings; first and second separate portions of a metallization for receiving solder bumps, the first portions extending over the walls and the bottom of the contact openings, the second portions covering the top of the passivation layer; and an encapsulation layer extending over the passivation layer and crossed by solder bumps extending in the contact openings.

The foregoing objects, features, and advantages of the present invention will be discussed in detail in the following non-limiting description of specific embodiments in connection with the accompanying drawings.

DETAILED DESCRIPTION

Figure 1:
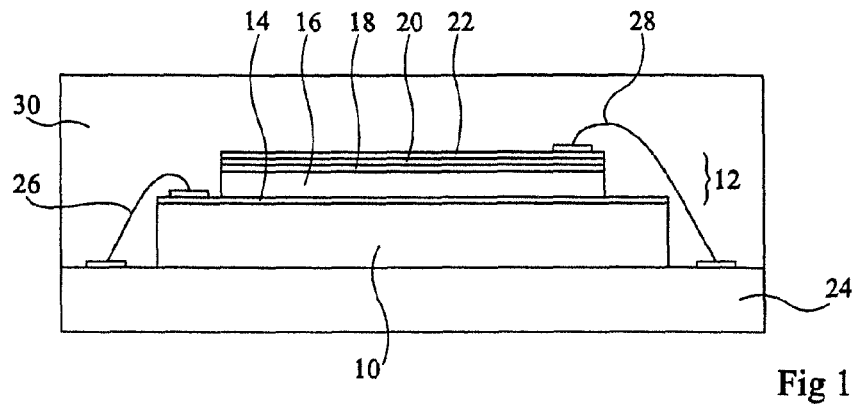
FIG. 1, previously described, schematically illustrates a conventional packaged lithium-ion type battery.

For clarity, the same elements have been designated with the same reference numerals in the different drawings and, further, as usual in the representation of image sensors, the various drawings are not to scale.

To solve the at least some of the above-mentioned problems, the present inventors provide directly encapsulating elementary batteries on the substrate on which they are formed, and this, before dicing (technique known as WMP, Wafer Molded Package). They further provide a specific encapsulation of elementary batteries, avoiding separations during the dicing and the penetration of aqueous compounds towards the active area of the battery during its use.

FIGS. 2A to 2E illustrate results of steps of a method according to an embodiment of the present invention.

Figure 2A:
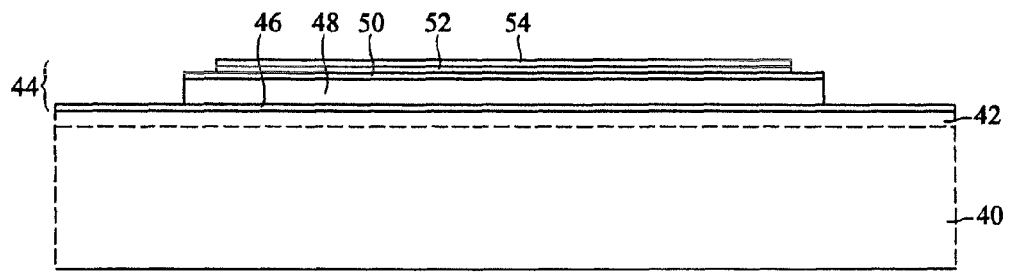
FIGS. 2A to 2E illustrate results of steps of a method according to an embodiment of the present invention.

At the step illustrated in FIG. 2A, it is started from a structure comprising a substrate 40, for example, a semiconductor substrate such as a silicon substrate. An insulating layer 42, for example, made of silicon oxide, may be formed on substrate 40 if necessary. As an example, substrate 40 may have a thickness ranging between 500 and 800 µm.

It should be noted that, in the drawings, a single elementary lithium-ion type battery is shown. It should be understood that many batteries are generally formed next to one another on the same substrate.

A stack 44 of the different layers forming a battery of lithium-ion type is formed on substrate 40 (or on insulating layer 42, if provided). Stack 44 may be formed by a succession of physical vapor depositions (PVD).

Stack 44 comprises the following elements:
A first layer 46 forming a cathode collector. This layer may be, as an example, made of titanium, tungsten, molybdenum, tantalum, or an alloy or a stack of these materials and have a thickness ranging between 100 and 500 nm.
A second layer 48 forming the battery cathode, made of a material such as LiTiOS (titanium lithium oxysulfide) or $LiCoO_2$ (cobalt lithium oxide) having a thickness ranging between 1 and 10 µm.
A third layer 50 forming the battery electrolyte, for example made of LiPON (lithium phosphorus oxynitride) or of any other material capable of forming a lithium-ion cell electrolyte. Third layer 50 has a thickness ranging between 1 and 3 µm.
A fourth layer 52 forming the battery anode, for example made of silicon, germanium, carbon, or a stack or an alloy of these materials. The fourth layer has a thickness ranging between 10 and 800 nm.
A fifth layer 54 forming an anode collector, for example formed by electrolytic growth at low temperature (to avoid causing a reaction of the layers formed of lithium compounds), for example, made of copper. As an example, this layer may have a thickness ranging between 100 and 500 nm.

Thus, stack 44 of layers 46 to 54 forming the active portion of the lithium-ion type battery may have a thickness ranging between 5 and 20 µm. It should be noted that a seed layer for the anode collector, for example, made of an alloy of titanium and copper, may be formed on layer 52 before forming of layer 54 by electrolytic growth. As an example, the seed layer may have a thickness ranging between 100 and 300 nm. It should be noted that the seed layer may be omitted if the material forming the anode collector layer is capable of being directly formed on the battery anode.

To enable to take a contact on the anode and cathode collector areas and to avoid short-circuits between the different layers of stack 44, these layers are provided to be formed in stages. Preferably, cathode collector layer 46 is formed over the entire surface of substrate 40/42. Layers 48 and 50 are formed on a surface area smaller than that taken up by layer 46 and, preferably, layers 52 to 54 are formed on a area smaller than that taken up by layers 48 and 50. This especially enables avoiding the forming of a short-circuit between cathode layer 48 and anode layer 52.

Figure 2B:
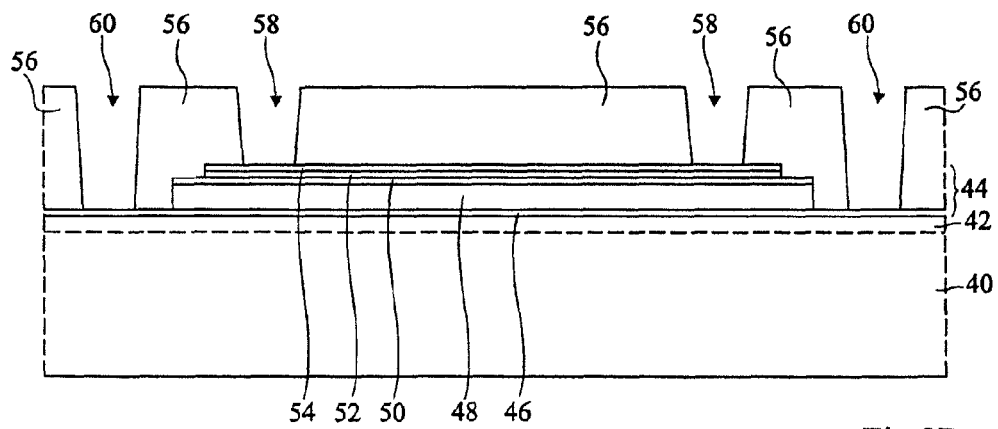

At the step illustrated in FIG. 2B, a passivation layer 56 in which through openings are formed has been deposited on the structure of FIG. 2A. As an example, layer 56 may be made of an epoxy resin, of silicon oxide, of an oxynitride, of a silicon nitride, of a polyimide, of BCB (Benzo-Cyclo-Butene) . . . . One or several through openings 58 are formed in layer 56 above anode collector layer 54 and one or several through openings 60 are formed in layer 56 above cathode collector layer 46, at locations where it is apparent. Openings 58 and 60 may be formed by lithography through a mask. It should be noted that the forming of several through openings above each of the anode and cathode collector layers provides a better mechanical stiffness of the device.

Figure 2C:
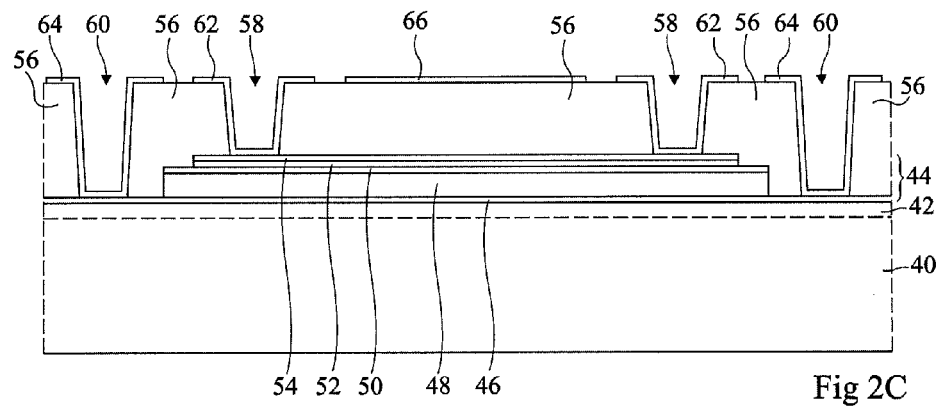

At the step illustrated in FIG. 2C, separate portions of an under-bump metallization (UBM) have been conformally formed on the structure of FIG. 2B. First UBM portions 62 are formed on the bottom and the walls of openings 58, and are thus in contact with anode collector layer 54. Second UBM portions 64 are formed on the bottom and the walls of openings 60, and are thus in contact with cathode collector layer 46. It should be noted that portions 62 and 64 are provided to slightly extend, on either side of openings 58 and 60, over passivation layer 56. A third UBM portion 66 is formed above passivation layer 56, over the entire surface of this layer delimited by openings 58. The spaces between the different UBM portions are provided to be small enough to cover almost the entire surface of passivation layer 56, while providing an insulation between the different UBM portions.

To form portions 62, 64, and 66, a UBM structure may for example be formed over the entire device of FIG. 2B, after which the structure may be etched as appropriate, for example, by a step of photolithography through a resin mask.

Conventionally, each portion 62, 64, and 66 is formed of a stack of three layers, the first one providing the adhesion to the lower layer, the second one forming a barrier against the diffusion between the lower layer and the third layer, and the third one providing the adhesion of the soldering and improving its wettability. A UBM stack is generally made of materials such as titanium, nickel, or gold.

Figure 2D:
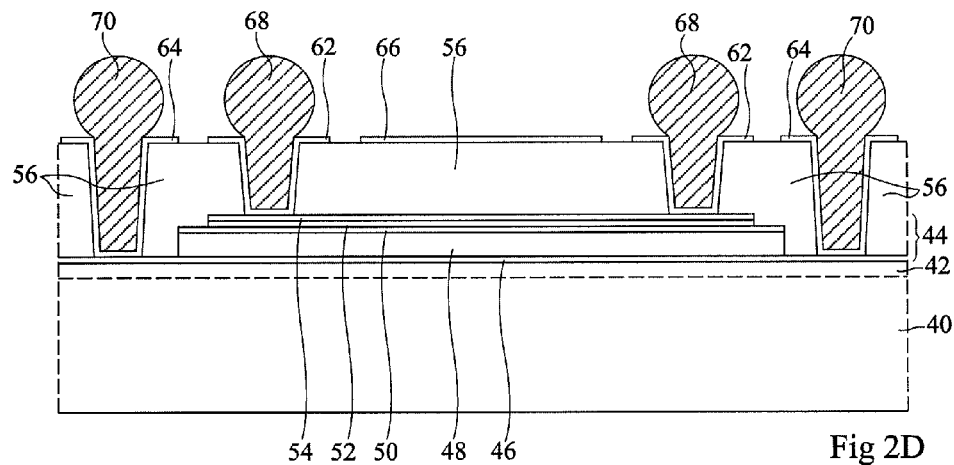

At the step illustrated in FIG. 2D, solder bumps 68, respectively 70, have been formed above UBM portions 62, respectively 64. Solder bumps 68 and 70 may be formed on the structure of FIG. 2C by any known method and extend in openings 58 and 60 of passivation layer 56. As an example, solder bumps 68 and 70 may have a diameter ranging between 100 and 400 μm. It should be noted that, conversely to what is shown in the drawings and as conventional, solder bumps 68 and 70 extend over the entire surface of UBM portions 62 and 64.

Figure 2E:
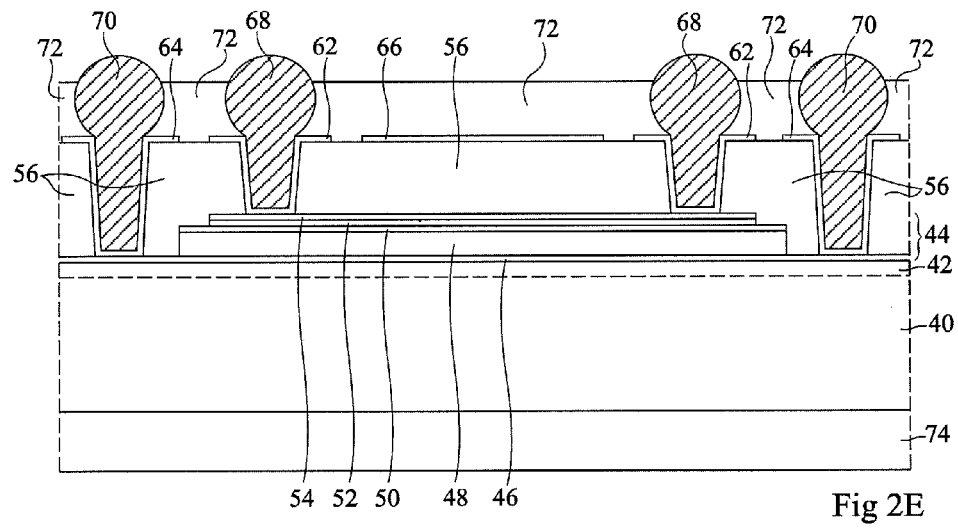

At the step illustrated in FIG. 2E, an encapsulation layer 72 leaving the upper portion of solder bumps 68 and 70 apparent has been formed on the structure of FIG. 2D. An encapsulation layer 74 is also formed on the lower surface of substrate 40 to complete the packaging of the device. As an example, encapsulation layers 72 and 74 may be made of any material conventionally used in techniques of direct encapsulation on the substrate of electronic components, for example, an epoxy resin.

Once the structure of FIG. 2E has been obtained, the individual batteries are diced to be used separately. Preferably, a scribe line having a length ranging between 90 and 150 μm will be provided. Advantageously, the individual diced batteries are directly usable, encapsulation layers 72 and 74 forming the package of these batteries. Thus, the ratio between the active surface area of the battery and the total surface area of the package is increased (by on the order of 75%), the encapsulation being directly performed on the substrate. Thus, in a package having a 3×3 mm$^2$ surface area, batteries having a capacity greater than 5 pAh may be formed.

Further, the presence of UBM portion 66 enables to avoid phenomena of resin separation at the contact of the battery when the individual batteries are being diced away from one another. Indeed, during this dicing, aqueous compounds used for the dicing and/or the cleaning are stopped in their penetration in to the device by UBM portion 66. UBM portion 66 also forms a barrier against the penetration of aqueous compounds when the battery is being used.

Figure 3B:
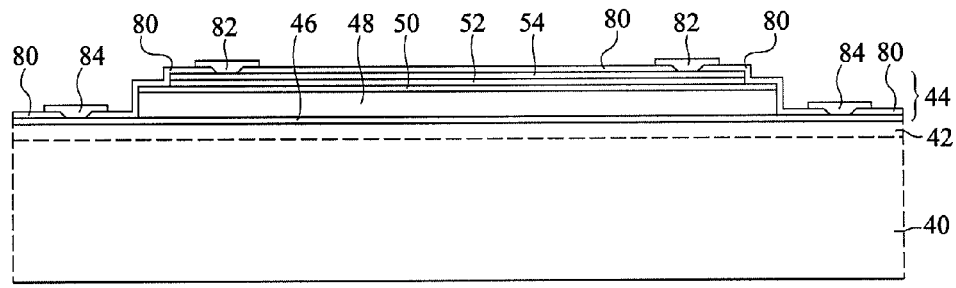
FIGS. 3B to 3D illustrate results of steps of a variation of a method according to an embodiment of the present invention.
Figure 3C:
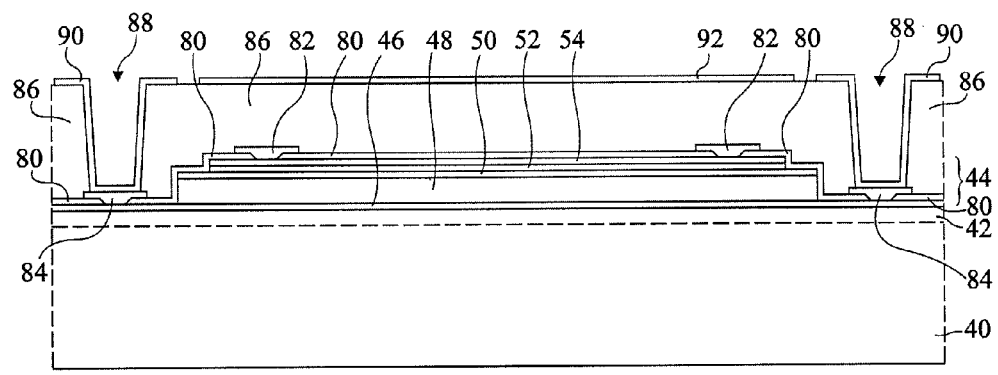
Figure 3D:
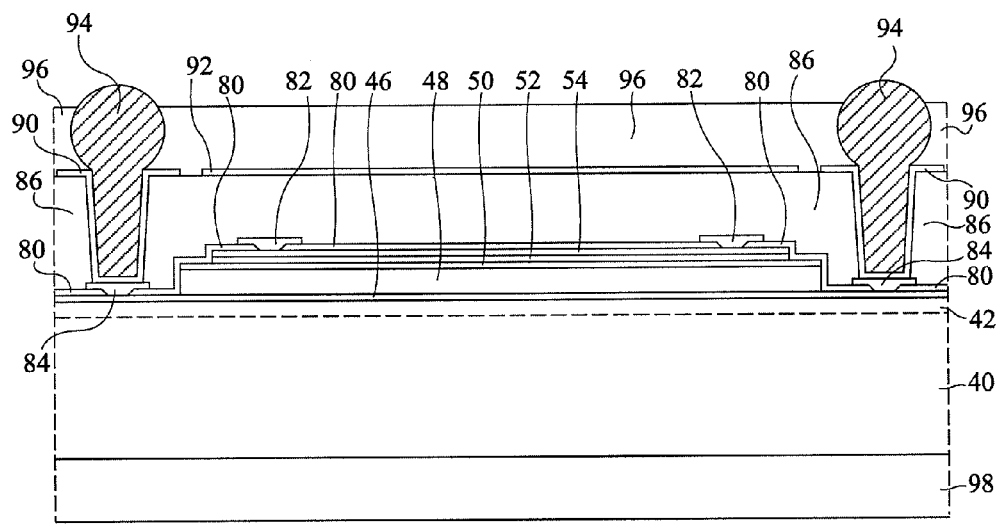

FIGS. 3B to 3D illustrate results of steps of a variation of the method of FIGS. 2B to 2E.

At the step illustrated in FIG. 3B, an insulating layer 80 has been conformally formed on the structure of FIG. 2A. As an example, layer 80 may be made of a low-temperature oxide or nitride (LTO-LTN). One or several through openings are then formed in insulating layer 80 at the level of desired contact points on the cathode and anode collector layers. In the shown example, two through openings are formed in insulating passivation layer 80 above cathode collector layer 46 and two other openings are formed above anode collector layer 54.

Once the through openings have been formed in layer 80, conductive portions are formed in these openings, which may extend over insulating layer 80 to subsequently form offset contacts on the structure.

First conductive portions 82 enable to offset the anode contacts towards the periphery of stack 44. Conductive regions 82 are in contact with anode collector layer 54 at the level of the openings in passivation layer 80 and extend over the structure all the way to a portion remote from stack 44, for example over a portion of passivation layer 80 formed on cathode collector layer 46.

Second conductive portions 84 are formed at the level of the openings in insulating layer 80 located above cathode collector layer 46. In the shown example, second conductive portions 84 actually form simple pads in contact with cathode collector layer 46. It should be noted that these pads may extend over insulating layer 80 to enable the forming of contacts at desired locations on the device.

As an example, conductive portions 82 and 84 may be formed by a conformal full-plate deposition of a seed layer, followed by a local electrolytic growth, for example, of copper, for example, defined by means of a resin formed by lithography.

At the step illustrated in FIG. 3C, a passivation layer 86 in which through openings are formed has been deposited over the structure of FIG. 3B. For example, passivation layer 86 may be made of an epoxy resin, of silicon oxide, of an oxynitride, of silicon nitride, of a polyimide, of BCB . . . . One or several through openings 88 are formed in layer 86 above cathode collector layer 46 and one or several through openings (not shown in FIG. 3D) are formed in layer 86, above the extensions of conductive portions 82.

Portions of an under-bump metallization UBM have then been formed on the structure. First UBM portions (not shown) are formed on the bottom and the walls of the openings of layer 86 above the extensions of conductive portions 82, and are thus in contact with the anode collector layer via portions 82. Second UBM portions 90 are formed on the bottom and the walls of openings 88, and are thus in contact with cathode collector layer 46. It should be noted that portions 90 are provided to slightly extend, on either side of openings 88, over passivation layer 86.

A third UBM portion 92 is formed, above passivation layer 86, over the surface of this layer delimited by openings 90. Thus, almost the entire surface of passivation layer 86 is covered with a UBM stack, the spaces between the different UBM portions being sufficient to isolate these different portions from one another.

To form UBM portions 90 and 92, a UBM structure may for example be formed all over the device of FIG. 3B, after which this structure may be etched.

At the step illustrated in FIG. 3D, solder bumps 94 have been formed above UBM portions 90 and solder bumps (not shown) have been formed above the UBM portions of contact with the anode collector of the battery. Solder bumps 94 may be formed on the structure by any known method and have, as an example, a diameter ranging between 100 and 400 µm.

Then, the structure is covered with an encapsulation layer 96 leaving the upper portion of bumps 94 apparent. An encapsulation layer 98 is also formed on the lower surface of substrate 40, to complete the packaging of the device. As an example, encapsulation layers 96 and 98 may be made of any other material conventionally used in techniques of direct encapsulation of electronic components on their substrate, for example, an epoxy resin.

Once the structure of FIG. 3D has been obtained, the elementary batteries are diced to be used individually. As in the case of the structure of FIG. 2E, the encapsulation being directly performed on the substrate, the ratio between the active surface area of the battery and the total surface area of the package is increased. Further, the presence of UBM portion 92 enables avoiding phenomena of separation of resin passivation layer 86 in contact with the battery during the dicing of the batteries into individual batteries and as the device is being used.

Further, the method described in relation with FIGS. 3B to 3D has the advantage of forming an encapsulated elementary battery in which no solder bump is formed in front of the stack of active layers of the battery. This enables avoiding settlings of this stack and degradations of the battery during the use of the encapsulated elementary battery.

Specific embodiments of the present invention have been described. Various alterations and modifications will occur to those skilled in the art. In particular, it should be noted that the materials used to form the active stack of the battery may be different from those mentioned hereabove, that is, any known material enabling to form thin-film lithium-ion type batteries. The same is true for the materials forming the passivation and encapsulation layers.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for encapsulating a thin-film lithium-ion type battery, comprising:
   (a) forming, on a substrate, an active stack having as a lower layer a cathode collector layer extending over a surface area larger than the surface area of other active stack layers; and
   (b) forming, over at least the active stack, an insulating passivation layer comprising a first through opening to receive an anode collector contact, and the passivation layer comprising a second through opening to receive a cathode collector contact, and
   (c) forming an encapsulation layer above a structure, the structure comprising at least the active stack and the passivation layer.

2. The method of claim 1, wherein (b) is preceded by:
   forming a conformal insulating layer over at least the active stack;
   defining through openings in the insulating layer to expose at least a portion of the cathode collector layer and at least a portion of an anode collector layer; and
   forming conductive portions in said through openings in the insulating layer, at least some of the conductive portions extending over the insulating layer to form offset contacts.

3. The method of claim 1, wherein (c) is preceded by forming of solder bumps on first portions of an under-bump metallization, the encapsulation layer leaving the surface of said solder bumps exposed.

4. The method of claim 1, wherein the substrate has a surface supporting the active stack and (c) further comprises forming a rear encapsulation layer on a substrate surface opposite to the substrate surface supporting the active stack.

5. The method of claim 1, further comprising an initial step of forming an insulating layer at a surface of the substrate.

6. The method of claim 1, wherein the passivation and encapsulation layers comprise an epoxy resin.

7. The method of claim 1, wherein first and second portions of an under-bump metallization are formed of a stack comprising a first layer, wherein the first layer enables adhesion to a layer below the first layer, and the stack comprises a second layer, wherein the second layer forms a barrier against diffusion between at least a layer below the second layer and a third layer, the third layer enabling adhesion of solder.

8. The method of claim 1, wherein the active stack further comprises, on the cathode collector layer, a cathode layer, an electrolyte layer, an anode layer, and an anode collector layer, wherein the anode layer and the anode collector layer each extend over a surface area smaller than that over which either the cathode layer and the electrolyte layer extend.

9. The method of claim 1, further comprising, before (c), forming first and second separate portions of an under-bump metallization, the first portions of the under-bump metallization being located on the walls and the bottom of the first and second through openings, the second portions of the under-bump metallization covering the passivation layer.

10. An encapsulated lithium-ion type battery, comprising:
    (a) on a substrate, an active stack having as a lower layer a cathode collector layer extending over a surface area greater than the surface area of any one of the other layers of the active stack;
    (b) an insulating passivation layer extending over the active stack and comprising a first through opening to receive an anode collector contact and the passivation layer comprising a second through opening to receive a cathode collector contact; and
    (c) first and second separate portions of a metallization for receiving solder bumps, a first portion extending over the walls and the bottom of the through openings, a second portion covering a top of the passivation layer; and
    (d) an encapsulation layer extending over the passivation layer and crossed by solder bumps extending in the through openings.

11. An encapsulated lithium-ion type battery, comprising:
    (a) on a substrate, an active stack having as a lower layer a cathode collector layer extending over a surface area greater than the surface area of any one of the other layers of the active stack;
    (b) an insulating passivation layer extending over the active stack and comprising a first through opening to receive an anode collector contact and the passivation layer comprising a second through opening to receive a cathode collector contact; and (c) an encapsulation layer extending over the passivation layer and crossed by cathode and anode collector contacts extending in the through openings.

12. The battery of claim 11, further comprising: first and second separate portions of a metallization for receiving cathode and anode collector contacts, the first portions extending over the walls and the bottom of the through openings, the second portions covering the top of the passivation layer.

* * * * *